US 8,775,342 B2

(12) United States Patent
Adair et al.

(10) Patent No.: US 8,775,342 B2
(45) Date of Patent: *Jul. 8, 2014

(54) INCREMENTAL CONTEXT ACCUMULATING SYSTEMS WITH INFORMATION CO-LOCATION FOR HIGH PERFORMANCE AND REAL-TIME DECISIONING SYSTEMS

(75) Inventors: Gregery G. Adair, Henderson, NV (US); Robert J. Butcher, Las Vegas, NV (US); Jeffrey J. Jonas, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,541

(22) Filed: Sep. 13, 2012

(65) Prior Publication Data
US 2013/0132400 A1   May 23, 2013

Related U.S. Application Data

(63) Continuation of application No. 13/302,900, filed on Nov. 22, 2011.

(51) Int. Cl.
*G06F 15/18* (2006.01)
(52) U.S. Cl.
USPC .............................. 706/21; 707/711; 707/741
(58) Field of Classification Search
CPC ....... G06N 7/005; G06N 99/005; G06N 3/08; G06F 17/30321; G06F 17/30368
See application file for complete search history.

(56) References Cited

U.S. PATENT DOCUMENTS

| | | | |
|---|---|---|---|
| 6,629,095 B1 * | 9/2003 | Wagstaff et al. | 1/1 |
| 7,072,863 B1 | 7/2006 | Phillips et al. | |
| 7,124,121 B1 * | 10/2006 | Drescher | 706/12 |
| 8,234,229 B2 | 7/2012 | Castelli et al. | |
| 2002/0049685 A1 | 4/2002 | Yaginuma | |
| 2003/0065409 A1 * | 4/2003 | Raeth et al. | 700/31 |
| 2003/0217140 A1 | 11/2003 | Burbeck et al. | |

(Continued)

OTHER PUBLICATIONS

"Distributed k-ary System: Algorithms for Distributed Hash Tables," by Ghodsi, Ali. In: Doctoral Dissertation, KTH—Royal Institute of Technology (2006). Available at: http://www.sics.se/~ali/thesis/.*

(Continued)

*Primary Examiner* — Daniel Kinsaul
(74) *Attorney, Agent, or Firm* — Janaki K. Davda; Konrad, Raynes, Davda and Victor LLP

(57) ABSTRACT

Provided are techniques for incrementally integrating and persisting context over an available observational space. At least one feature associated with a new observation is used to create at least one index key. The at least one index key is used to query one or more reverse lookup tables to locate at least one previously persisted candidate observation. The new observation is evaluated against the at least one previously persisted candidate observation to determine at least one relationship. In response to determining the at least one relationship, a threshold is used to make a new assertion about the at least one relationship. The new observation is used to review previous assertions to determine whether a previous assertion is to be reversed. In response to reversing the previous assertion, the new observation, the new assertion, and the reversed assertion are incrementally integrated into persistent context.

10 Claims, 12 Drawing Sheets

(56) References Cited

U.S. PATENT DOCUMENTS

| | | | |
|---|---|---|---|
| 2004/0074826 | A1 | 4/2004 | Oka et al. |
| 2004/0267455 | A1* | 12/2004 | Hatano et al. ............... 702/2 |
| 2006/0085164 | A1* | 4/2006 | Leyton et al. ............... 702/179 |
| 2006/0236227 | A1 | 10/2006 | Achilles et al. |
| 2007/0005753 | A1 | 1/2007 | Crosby et al. |
| 2007/0198450 | A1 | 8/2007 | Khalsa |
| 2007/0239804 | A1 | 10/2007 | Armstrong et al. |
| 2008/0181485 | A1 | 7/2008 | Beis et al. |
| 2008/0208901 | A1* | 8/2008 | Friedlander et al. ....... 707/104.1 |
| 2010/0241507 | A1 | 9/2010 | Quinn et al. |
| 2010/0299301 | A1 | 11/2010 | Busch et al. |
| 2010/0332475 | A1* | 12/2010 | Birdwell et al. ............ 707/737 |
| 2011/0055087 | A1 | 3/2011 | Chen-Ritzo et al. |
| 2011/0270796 | A1* | 11/2011 | Andreoli et al. ............ 706/52 |

OTHER PUBLICATIONS

Jonas, J., "Sequence Neutrality in Information Systems", [online], Jan. 26, 2006 [retrieved on Jul. 8, 2011], retrieved from the Internet at <URL: http://jeffjonas.typepad.com/jeff_jonas/2006/01/sequence_neutra.html>, 4 pp.

U.S. Appl. No. 13/302,900, filed Nov. 22, 2011, entitled "Incremental Context Accumulating Systems with Information Co-Location for High Performance and Real-Time Decisioning Systems", invented by Adair, G.S., R.J. Butcher, and J.J. Jonas, Total pp. 35 [54.71 (Appln)].

Preliminary Amendment, Sep. 13, 2012, for U.S. Appl. No. 13/302,900, filed Nov. 22, 2011 by G.S. Adair et al., Total pp. 6 [54.71 (PrelimAmend)].

Office Action, dated Mar. 21, 2013, for U.S. Appl. No. 13/302,900 (54.71), filed Nov. 22, 2011, entitled "Incremental Context Accumulating Systems With Information Co-Location for High Performance and Real-Time Decisioning Systems", invented by Gregory G. Adair et al., pp. 1-21.

Response to Office Action, dated Jun. 20, 2013, for U.S. Appl. No. 13/302,900 (54.71), filed Nov. 22, 2011, entitled "Incremental Context Accumulating Systems With Information Co-Location for High Performance and Real-Time Decisioning Systems", invented by Gregory G. Adair et al., pp. 1-14.

Notice of Allowance, dated Oct. 11, 2013, for U.S. Appl. No. 13/302,900 (54.71), filed Nov. 22, 2011, entitled "Incremental Context Accumulating Systems With Information Co-Location for High Performance and Real-Time Decisioning Systems", invented by Gregory G. Adair et al., pp. 1-16.

\* cited by examiner

FIG. 2

Primary Table 200

| TRANSACTION IDENTIFIER (ID) | SOURCE SYSTEM | SOURCE TYPE | DATE | TIME | LATITUDE | LONGITUDE | FEATURE HASH |
|---|---|---|---|---|---|---|---|
| 1 | Telescope 1: Picture 9001 | Actual Sensor | 1/1/11 | 1:05 am | X | Y | ABCD |
| 2 | Telescope 1: Picture 9001 | Actual Sensor | 1/1/11 | 1:06 am | X + 1 | Y + 1 | 1234 |
| 3 | Telescope 1: Picture 9001 | Actual Sensor | 1/1/11 | 1:07 am | X + 2 | Y + 2 | AB12 |
| 4 | Forecast Engine : Run 57 | Historical Forecast | 1/1/11 | 1:04 am | X - 1 | Y - 1 | 12AB |
| 5 | Forecast Engine : Run 57 | Historical Forecast | 1/1/11 | 1:03 am | X - 2 | Y - 2 | ... |
| 6 | Forecast Engine : Run 57 | Historical Forecast | 1/1/11 | 1:02 am | X - 3 | Y - 3 | ... |
| 7 | Forecast Engine : Run 57 | Historical Forecast | 1/1/11 | 1:01 am | X - 4 | Y - 4 | ... |
| 8 | Forecast Engine : Run 57 | Historical Forecast | 1/1/11 | 1:00 am | X - 5 | Y - 5 | ... |
| 9 | Forecast Engine : Run 57 | Future Forecast | 1/1/11 | 1:08 am | X + 3 | Y + 3 | ... |
| 10 | Forecast Engine : Run 57 | Future Forecast | 1/1/11 | 1:09 am | X + 4 | Y + 4 | ... |
| 11 | Forecast Engine : Run 57 | Future Forecast | 1/1/11 | 1:10 am | X + 5 | Y + 5 | ... |
| 12 | User: Query 570 | User Query | 1/1/11 | 1:11 am | X + 6 | Y + 6 | ... |
| 13 | System App : Query 684 | System Query | 1/1/11 | 1:12 am | X + 7 | Y + 7 | ... |

First Reverse Lookup Table
400

| DATE | TIME | TRANSACTION IDENTIFIER (ID) |
|---|---|---|
| 1/1/11 | 1:05 am | 1 |
| 1/1/11 | 1:06 am | 2 |
| 1/1/11 | 1:07 am | 3 |
| 1/1/11 | 1:04 am | 4 |
| 1/1/11 | 1:03 am | 5 |
| 1/1/11 | 1:02 am | 6 |
| 1/1/11 | 1:01 am | 7 |
| 1/1/11 | 1:00 am | 8 |
| 1/1/11 | 1:08 am | 9 |
| 1/1/11 | 1:09 am | 10 |
| 1/1/11 | 1:10 am | 11 |
| 1/1/11 | 1:11 am | 12 |
| 1/1/11 | 1:12 am | 13 |

FIG. 4

Index
(on First Reverse Lookup Table)
500

| DATE | TIME |
|---|---|
| 1/1/11 | 1:05 am |
| 1/1/11 | 1:06 am |
| 1/1/11 | 1:07 am |
| 1/1/11 | 1:04 am |
| 1/1/11 | 1:03 am |
| 1/1/11 | 1:02 am |
| 1/1/11 | 1:01 am |
| 1/1/11 | 1:00 am |
| 1/1/11 | 1:08 am |
| 1/1/11 | 1:09 am |
| 1/1/11 | 1:10 am |
| 1/1/11 | 1:11 am |
| 1/1/11 | 1:12 am |

FIG. 5

Index
(on Second Reverse Lookup Table)
700

| LATITUDE | LONGITUDE |
|---|---|
| X | Y |
| X + 1 | Y + 1 |
| X + 2 | Y + 2 |
| X - 1 | Y - 1 |
| X - 2 | Y - 2 |
| X - 3 | Y - 3 |
| X - 4 | Y - 4 |
| X - 5 | Y - 5 |
| X + 3 | Y + 3 |
| X + 4 | Y + 4 |
| X + 5 | Y + 5 |
| X + 6 | Y + 6 |
| X + 7 | Y + 7 |

FIG. 7

Reverse Lookup Table
(for Feature Hash)
800

| FEATURE HASH | TRANSACTION IDENTIFIER (ID) |
|---|---|
| ABCD | 1 |
| 1234 | 2 |
| AB12 | 3 |
| 12AB | 4 |
| ... | 5 |
| ... | 6 |
| ... | 7 |
| ... | 8 |
| ... | 9 |
| ... | 10 |
| ... | 11 |
| ... | 12 |
| ... | 13 |

FIG. 8

INCREMENTAL CONTEXT ACCUMULATING SYSTEMS WITH INFORMATION CO-LOCATION FOR HIGH PERFORMANCE AND REAL-TIME DECISIONING SYSTEMS

CROSS-REFERENCE TO RELATED APPLICATION

This application is a continuation of U.S. patent application Ser. No. 13/302,900, filed Nov. 22, 2011, which application is incorporated herein by reference in its entirety.

BACKGROUND

Embodiments of the invention relate to incrementally accumulating context a new observations present themselves, using information co-located, in support of real-time decisioning.

Observations have features, and overlapping features across observations enable context to accrue. Determining how a new observation locates historical context is accomplished by using the new observation's features to locate candidate observations. Since historical observations end up with several needed access paths for future discovery, traditional systems provide several indexes. Implementing several indexes requires physically choosing which index to optimize around, while the other indexes become less optimal access methods (when dealing with large data sets).

Some systems use sharding, which is a technique that uses hash values to evenly distribute data and/or indices across multiple tables. The even distribution of values enables near linear-scale context accumulation in grid computer environments.

SUMMARY

Provided are a method, computer program product, and system for incrementally integrating and persisting context over an available observational space. A new observation is obtained. At least one feature associated with the new observation is used to create at least one index key. The at least one index key is used to query one or more reverse lookup tables to locate at least one previously persisted candidate observation, wherein each of the one or more reverse lookup tables has an associated index. The new observation is evaluated against the at least one previously persisted candidate observation to determine at least one relationship. In response to determining the at least one relationship, a threshold is used to make a new assertion about the at least one relationship. The new observation is used to review previous assertions to determine whether a previous assertion is to be reversed. In response to reversing the previous assertion, the new observation, the new assertion, and the reversed assertion are incrementally integrated into persistent context. The persistent context is used to make a decision.

BRIEF DESCRIPTION OF THE SEVERAL VIEWS OF THE DRAWINGS

In the drawings, like reference numbers represent corresponding parts throughout.

FIG. 2 illustrates, in a block diagram, an example primary table in accordance with certain embodiments.

FIG. 4 illustrates a first reverse lookup table 400 in accordance with certain embodiments.

FIG. 5 illustrates an index for a first reverse lookup table in accordance with certain embodiments.

FIG. 7 illustrates an index for a second reverse lookup table in accordance with certain embodiments.

FIG. 8 illustrates a reverse lookup table for a feature hash in accordance with certain embodiments.

FIG. 10 is formed by FIG. 10A and FIG. 10B.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments implement a generalized schema that permits the co-location of very diverse observations in the same table and index. In this manner reference data, transactional data, hypothesis, forward projections, historical projections, user queries and more co-exist in the same tables and indexes. This aspect of the embodiments enables improved performance over federated tables that require more lookups and joins.

A schema may be described as a blueprint of data structures for tables and indexes. When a table or index is distributed over multiple tables, the schema is loaded in each of the multiple tables, and values may be distributed evenly across the multiple tables.

Embodiments provide a context accumulating system that is implemented with one index per table structure. This means that each table and index may be physically optimized. Such optimization supports a high performance context accumulating system, which asks the question: now that a new observation is known, how does it relate to what is already known, and had this new observation been known in the beginning (first), would any previous assertions have been made differently. If so, the context accumulating system corrects the previous assertions (at that split second). This self-correcting context model enables higher quality, real-time, prediction processing. The co-location element of the context accumulating system speaks to the notion that convergence of diverse observational data e.g., transactional data, reference data, queries (i.e., searches from users or systems), and projections (i.e., forecast data) into the same table structures and same indexes allows for the integration of new observations into the persistent context to be performed more accurately and on a larger scale (volume and speed).

Figure 1:
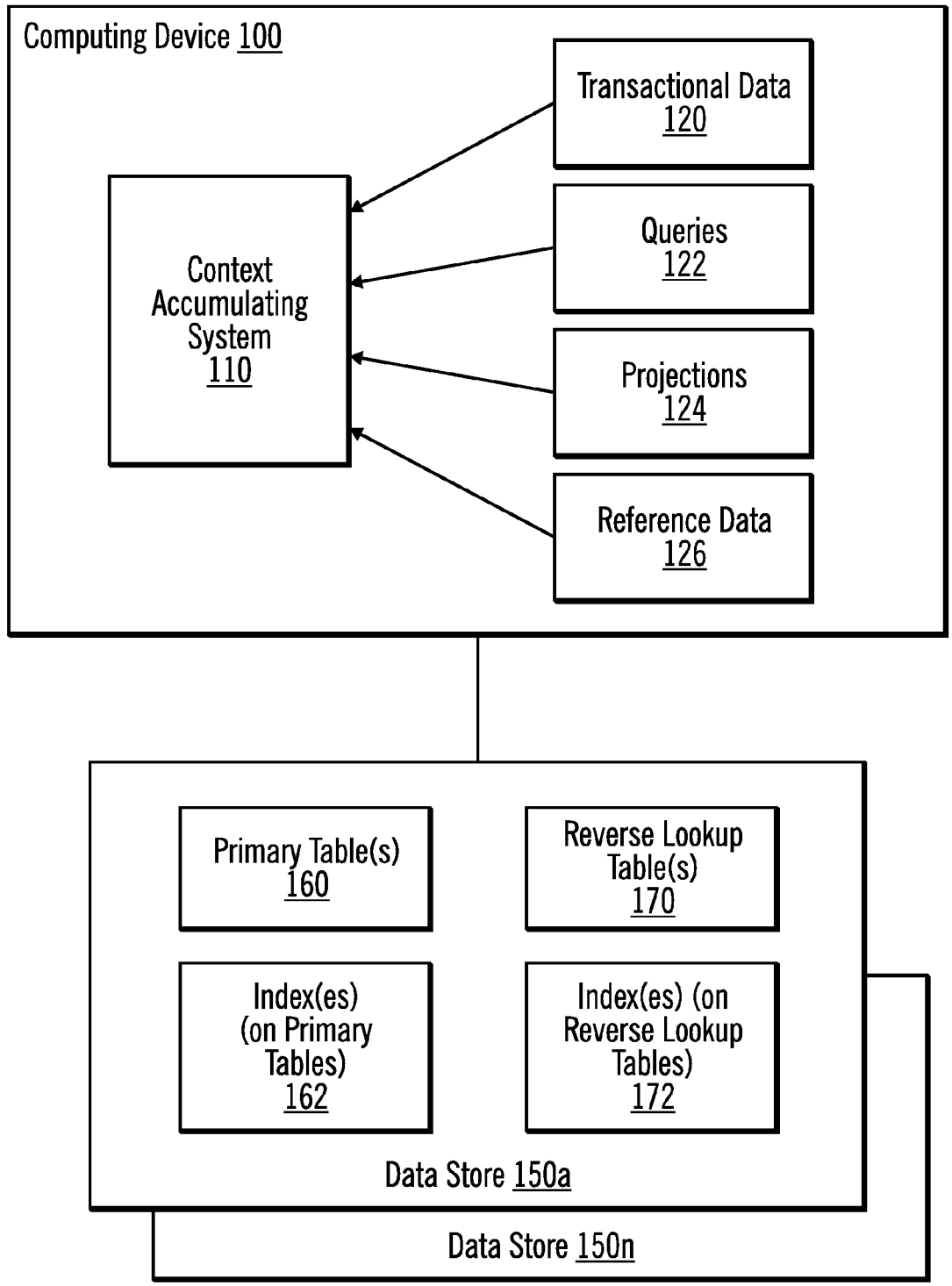
FIG. 1 illustrates, in a block diagram, a computing environment in accordance with certain embodiments.

FIG. 1 illustrates, in a block diagram, a computing environment in accordance with certain embodiments. In FIG. 1, a computing device 100 is coupled to one or more data stores 150a...150n. The computing device 100 includes a context accumulating system 110. The context accumulating system 110 receives one or more of the following as input: transactional data 120, one or more queries 122, one or more projections 124, and reference data 126. In other embodiments, other data may also be input to the context accumulating system 110. The transactional data 120 describes an event (i.e., a change as a result of a transaction) and may include a time dimension and a numerical value and may refer to reference data (i.e., one or more objects). The queries 122 may be described as searches of the one or more data stores 150a...150n. The projections 124 include future forecasts and historical forecasts. A future forecast makes a prediction about the future, while a historical forecast makes a prediction about the past. The reference data 126 describes one or more objects and properties of these objects. The reference data 126 may change over time based on transactions performed on the reference data 126.

Each data store 150a...150n includes one or more primary tables 160, one or more indexes 162 on the primary tables, one or more reverse lookup tables 170, and one ore more indexes 172 on the reverse lookup tables. In certain embodiments, there is one index 162 associated with one primary table 172. In certain embodiments, there is one index 172 associated with one reverse lookup table 170. The one or more reverse lookup tables 170 and the one or more indexes 172 may also be described as a hierarchical index retrieval system. A reverse lookup table 170 may be described as an index into an associated primary table 160. The primary lookup tables 160 and reverse lookup tables 170 may be described as storing observations, their features, and assertions about these observations and features (e.g., same, related, etc.).

A table can be accessed using an index. An index may be described as an ordered set of references (e.g., pointers) to the records in the table. The index is used to access each record in the table using an index key (i.e., one or more fields or attributes of the record, which correspond to columns).

The computing environment of FIG. 1 may be described as a real-time, scalable prediction system in which the context accumulating system 110 uses transactional data 120, queries 122, projections 124, and reference data 126 to adjust previous assertions and create new assertions.

Also, in certain embodiments, the context accumulating system 110 may be used to store future and historical forecasts in the same table and on the same index as the transaction-oriented observations. Such information co-location is useful for making sense of real-time observations as secondary lookups in secondary tables is eliminated. In embodiments, any feature (or plurality of features, e.g., zip code+ date of birth) can be called for once to discover any and all observations of any kind that have ever shared that feature.

FIG. 2 illustrates, in a block diagram, an example primary table 200 in accordance with certain embodiments. The primary table 200 includes columns for a transaction identifier (also known as a feature identifier), a source system from which the data is obtained, a source type, a date, a time, a latitude, a longitude, and a feature hash. The source of the data may be an actual observation (e.g., obtained using an actual, physical sensor), a historical forecast (e.g., obtained by making a prediction based on the actual observation), a future forecast (e.g., obtained by making a prediction based on the actual observation), or a query. Queries may use the same feature types as the observations. The columns for date, time, latitude, and longitude may also be referred to as feature columns. The feature hash may be generated using some hash algorithm (e.g., using MD5 Message-Digest Algorithm or a Secure Hash Algorithm-1 (SHA-1)). The feature hash may be used to determine whether a feature exists in a table or index. Ellipses indicate that other values are included in a column.

Figure 3:
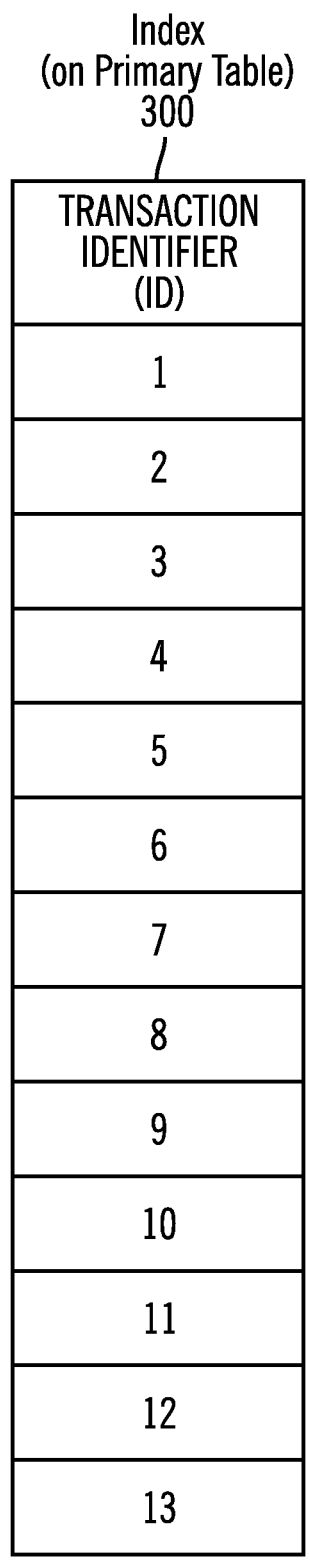
FIG. 3 illustrates an index on a primary table in accordance with certain embodiments.

FIG. 3 illustrates an index 300 on the primary table 200 in accordance with certain embodiments. The index 300 includes columns for: a transaction identifier.

FIG. 4 illustrates a first reverse lookup table 400 in accordance with certain embodiments. The reverse lookup table 400 has columns for: date, time, and transaction identifier.

FIG. 5 illustrates an index 500 on the first reverse lookup table 400 in accordance with certain embodiments. The index 500 has columns for: date and time.

Figure 6:
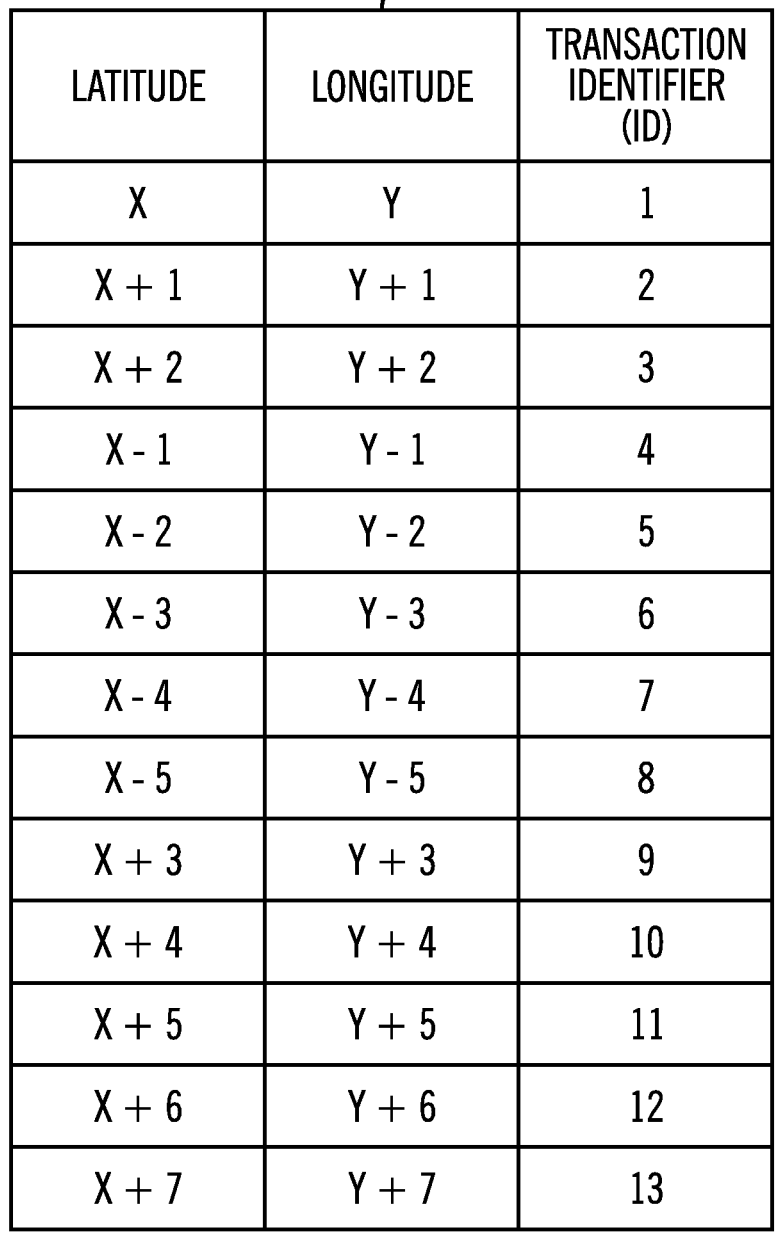
FIG. 6 illustrates a second reverse lookup table in accordance with certain embodiments.

FIG. 6 illustrates a second reverse lookup table 600 in accordance with certain embodiments. The reverse lookup table 600 has columns for: latitude, longitude, and transaction identifier.

FIG. 7 illustrates an index 700 on the second reverse lookup table 600 in accordance with certain embodiments. The index 700 has columns for: latitude and longitude.

In certain embodiments, indexed values are first hashed using a hash technique to ensure even distribution when partitioning/sharing tables and indexes over "M" nodes (e.g., in a grid computer infrastructure). In certain embodiments, a hash technique is used to evenly distribute values of a table (e.g., across either an index tree or a hash mapped back end). Each of the M nodes comprises an instance of a table (e.g., a database, an Indexed Sequential Access Method (ISAM) file, an HBase data store, etc.). In certain embodiments, the table that is spread across M nodes may be a primary table, an index on a primary table, a reverse lookup table or an index on a reverse lookup table.

In one example hash distribution process, an index key is hashed to an integer value via some hash technique. For example, with reference to FIG. 4, the index key is the date and time. So the index key (e.g., Jan. 1/1/11+1:05 AM) is hashed to an integer "N". The table is spread across M nodes, so the hashed integer N is divided by M, and the remainder is used to index into one of the M nodes where the data is to be stored. In this manner, data is spread across M nodes. This distribution is known as "sharding".

FIG. 8 illustrates a reverse lookup table 800 for a feature hash in accordance with certain embodiments. The reverse lookup table 800 has columns for: feature hash and transaction identifier. Ellipses indicate that other values are included in a column.

Figure 9:
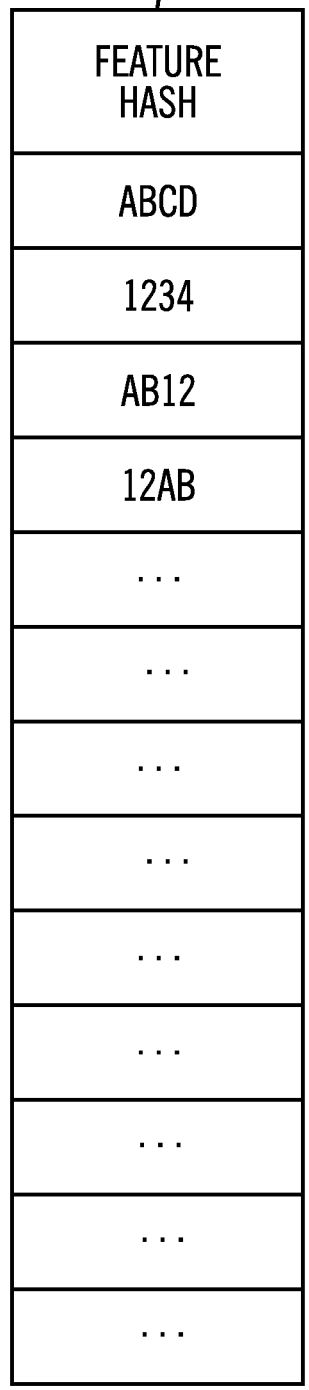
FIG. 9 illustrates an index for a reverse lookup table for a feature hash in accordance with certain embodiments.

FIG. 9 illustrates an index 900 for a reverse lookup table for a feature hash in accordance with certain embodiments. The index 900 has a column for: feature hash. Ellipses indicate that other values are included in a column.

Thus, the context accumulating system 110 "co-locates" data by storing diverse data in the same schema using the same index keys.

Imagine a context accumulating system applied to the tracking of asteroids. In such a domain, there are historical detections that have not yet been associated to a known entity, there are collections of detections that have been integrated and are now known entities, and there can be forecasts of where these entities (asteroids) have been in the past, and where they are expected to be in the future. As shall be demonstrated with this example, the actual, past, present and future anticipated observations are co-located in the same table and index space.

The generation of forecasts will produce predictions (i.e., future trajectories and historical trajectories) based on actual observations. For example, by following asteroid observations (e.g., actual observations from photographs) containing X, Y, T (where X is latitude, Y is longitude, and T is time), a forecast engine computes a distance (d) attribute, a speed attribute, and a trajectory. While this typically requires eight such data points, for simplicity we use only four in this demonstration. With speed and trajectory, the forecast engine computes projections (i.e., expected observations), including both future (i.e., where the asteroid will be) and historical (i.e., where the asteroid was) projections, that include estimations of "when" the asteroid was or will be at a particular location. In certain embodiments, these projections are created as prediction transactions that are provided to the context accumulating system 110. The context accumulating system 110 persists the actual observations with the prediction transactions (i.e., the historical and future forecasts) in the same data space (i.e., same table). For example, the same data space may refer to the same table, such as table 200 in FIG. 2.

Continuing with this example, when new asteroid sightings are made in the future, access to any previous predictions about what should be there are in fact already awaiting recall in real-time.

Moreover, when predications of the past are made, the context accumulating system 110 uses the past predictions to identify (i.e., locate) stored, previous detections that have not yet been associated with a known entity. Thus, the context accumulating system 110 uses these historical projections to claim (integrate via their assignment to the known entity) previous, unresolved ambiguity as fast as new observations (in the case computed historical trajectories) stream in.

Figure 10A:
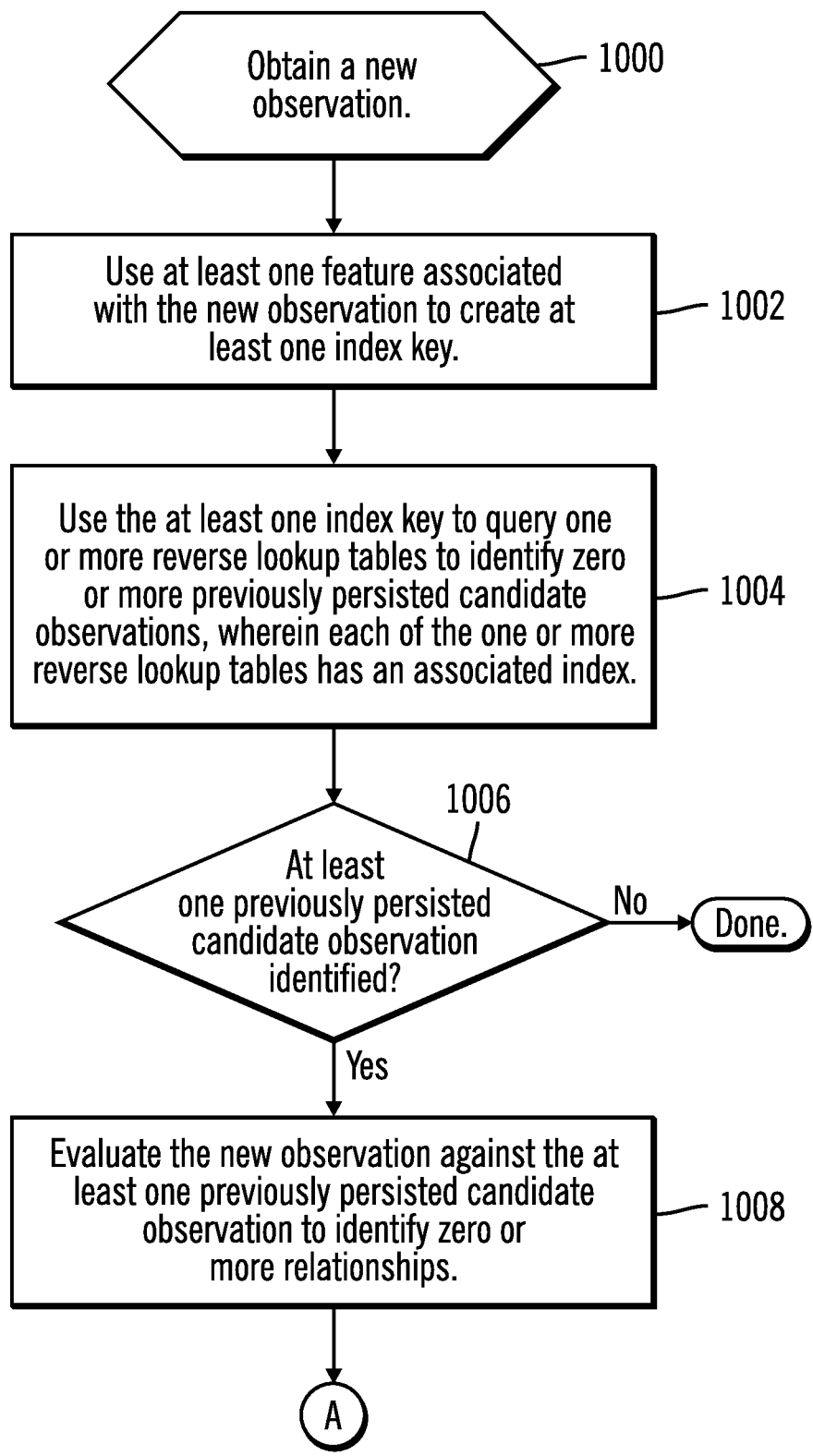
FIG. 10 illustrates, in a flow diagram, logic for incrementally integrating and persisting context over an available observational space in accordance with certain embodiments.
Figure 10B:
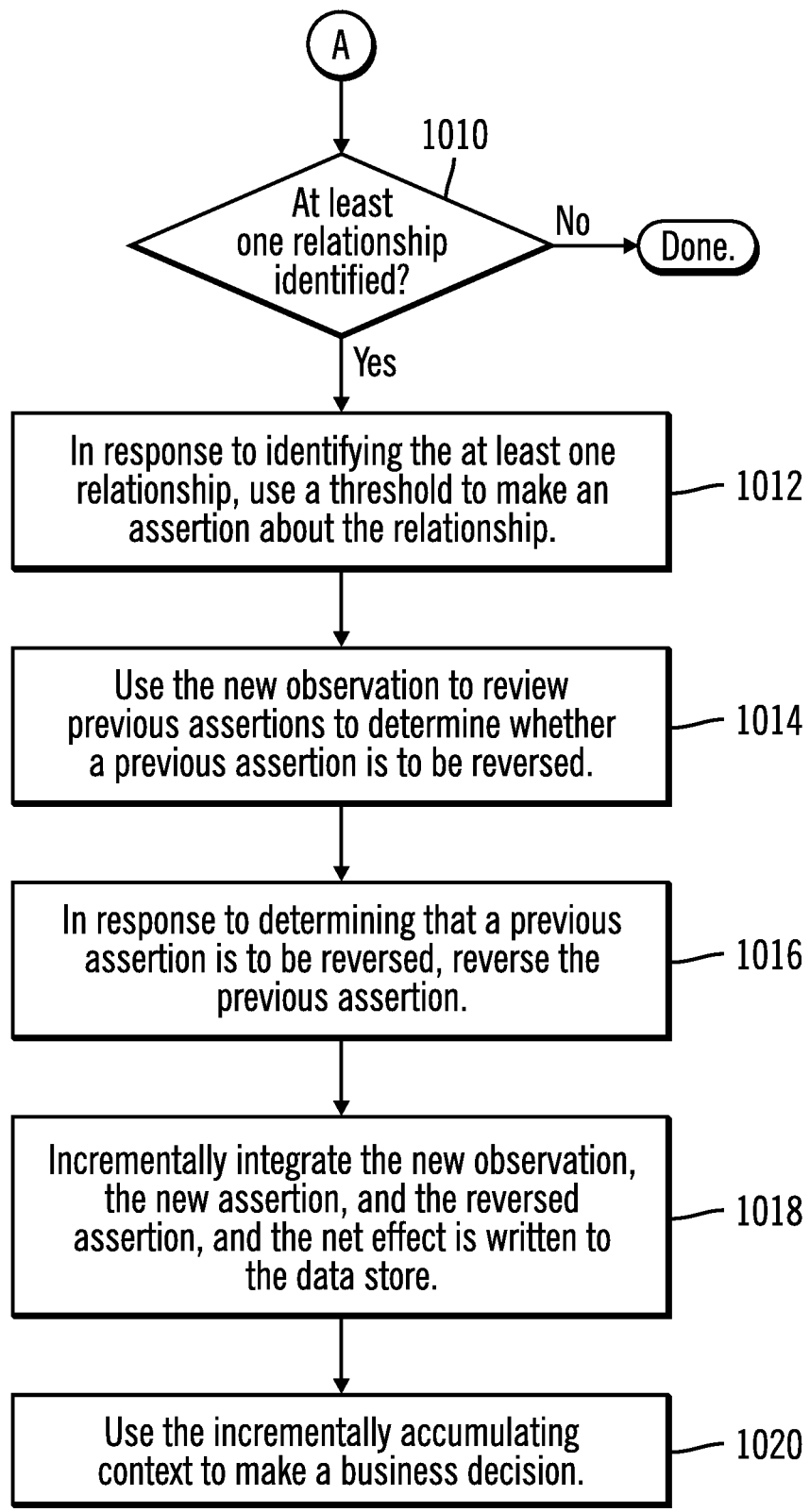

FIG. 10 illustrates, in a flow diagram, logic for incrementally integrating and persisting context over an available observational space in accordance with certain embodiments. FIG. 10 is formed by FIG. 10A and FIG. 10B. Processing begins at block 1000 with the context accumulating system 110 obtaining a new observation (i.e., an actual observation). For example, the context accumulating system 110 may obtain the new observation from a query (from a user or a system), directly (e.g., from a sensor) or a tertiary system e.g., a forecast engine. In block 1002, the context accumulating system 110 uses at least one feature associated with the new observation to create at least one index key.

In block 1004, the context accumulating system 110 uses the at least one index key to query one or more reverse lookup tables to identify zero or more previously persisted candidate observations, wherein each of the one or more reverse lookup tables has an associated index. In certain embodiments, the one or more reverse lookup tables and each associated index is defined with one schema. In certain embodiments, one index access path is available for responding to each query. In certain embodiments, the context accumulating system 110 may not find a candidate observation for the first observation (as there is only the first observation or first such feature). In certain embodiments, the context accumulating system 110 may not find a candidate for a particular new (other than first) observation or for some set of new observations (e.g., new observations 0 . . . N).

In certain embodiments, there is a primary table and a reverse index table that persist which observations contain which features. The observations reference one or more transaction_ID columns in the table that persist those features. For example, an OBSERVATION_FEATURE table would have an observation_ID column, which is indexed, and a transaction_ID column. The reverse index table would have a transaction_ID column, which is indexed, and an observation_ID column. When a new observation comes in, the context accumulating system 110 compares features to the feature table to look up the transaction_ID (if it exists) or to insert and assign a transaction_ID (if it is new). For existing features, the context accumulating system 110 can look up which observations also have that feature in the table that is indexed on the transaction_ID and return the observation_ID.

In block 1006, the context accumulating system 110 determines whether at least one previously persisted candidate observations identified. If so, processing continues to block 1006, otherwise, processing is done. The processing of FIG. 10 is performed again for the next, new observation.

In block 1008, the context accumulating system 110 evaluates the new observation against the at least one, previously persisted candidate observations to identify zero or more relationships. In certain embodiments, the context accumulating system 110 may assert a candidate is the same as the new observation and, thus, conjoin the two observations.

In block 1010, the context accumulating system 110 determines whether at least one relationship has been identified. If so, processing continues to block 1012, otherwise, processing is done. The processing of FIG. 10 is performed again for the next, new observation.

In block 1012, in response to identifying the at least one relationship, the context accumulating system 110 uses a threshold to make an assertion about the relationships. From block 1008 (FIG. 10A), processing continues to block 1010 (FIG. 10B). For example, the threshold may be based on a certain number of features that match between the new observation and a candidate observation.

In block 1014, the context accumulating system 110 uses the new observation to review previous assertions to determine whether a previous (i.e., earlier) assertion is to be reversed. In block 1016, in response to determining that a previous assertion is to be reversed, the context accumulating system 110 reverses the previous assertion.

In block 1018, the context accumulating system 110 incrementally integrates the new observation, the new assertion, and the reversed previous assertion, and the net effect is written to a table ("persistent context"). Persistent context is represented in data store 150a . . . 150n by the assertions (of same and related) about the observations seen to date. That is, in response to reversing the previous assertion, the new observation, the new assertion, and the reversed assertion are incrementally integrated into persistent context.

In block 1020, the context accumulating system 110 uses the incrementally accumulating persistent context to make a decision. In certain embodiments, the decision is a business decision. Examples of business decisions include, for example: presenting an ad on a web page; stopping an internet transaction over a cybersecurity issue; notifying an agent; notifying security; allowing or denying a request; etc. Another example of a decision is: after discovering that an asteroid is on course to collide with earth, forwarding that discovery (to someone, a system, etc.).

In certain embodiments, the values of one or more reverse lookup tables and each associated index may be distributed over multiple tables, and a hash technique is used to evenly distribute values of the one or more reverse lookup tables and each associated index over the multiple tables. Similarly, the values of the primary table and the index on the primary table may be distributed over multiple tables, and a hash technique is used to evenly distribute the values of the primary table and the index on the primary table over the multiple tables.

In certain embodiments, a new observation is related to existing observations based on a plurality features, including functions of features. This accounts for things such as extracting the last four digits of a Social Security Number (SSN) and using this in isolation or in conjunction with other features. In certain embodiments, the plurality of features include at least one of location and time.

In certain embodiments, a new observation includes a space time coordinate, and the index key is used to identify candidate observations based on the space time coordinate.

In certain embodiments, the observations include predicted observations. In certain embodiments, the observations include transactional data (e.g., a purchase, a money transfer, a boarder crossing, etc.). In certain embodiments, the observations include reference data (e.g., all city names and postal codes across the world).

In certain embodiments, the new observation is related to existing observations based on shared features, including location or time.

In certain embodiments, the new observation includes a location, and the index key used to identify candidate observations in part based on the location.

In certain embodiments, the context accumulating system 110 receives data, evaluates the received data against at least one other previously received data, persists the received data in a common data space, computes an observation (i.e., a predication or a projection) using at least two data elements, and supplies the observation as new, received data that is persisted in the common data space.

In certain embodiments, the received data is persisted to some form of permanent storage (e.g., a spinning disk or solid-state drive). In certain embodiments, the new observation replaces a previous observation now deemed incorrect or obsolete. In other words, a previous record updated. In certain embodiments, new observations are reversing earlier assertions of same or related. In certain embodiments, the observations (i.e., predictions) have to do with space. In certain embodiments, the observations (i.e., predictions) have to do with time. In certain embodiments, the observations (i.e., predictions) have to do with value. In certain embodiments, the observations (i.e., predictions) have to do with state. In certain embodiments, the observations have to do with some combination of: space, time, value, and state.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Figure 11:
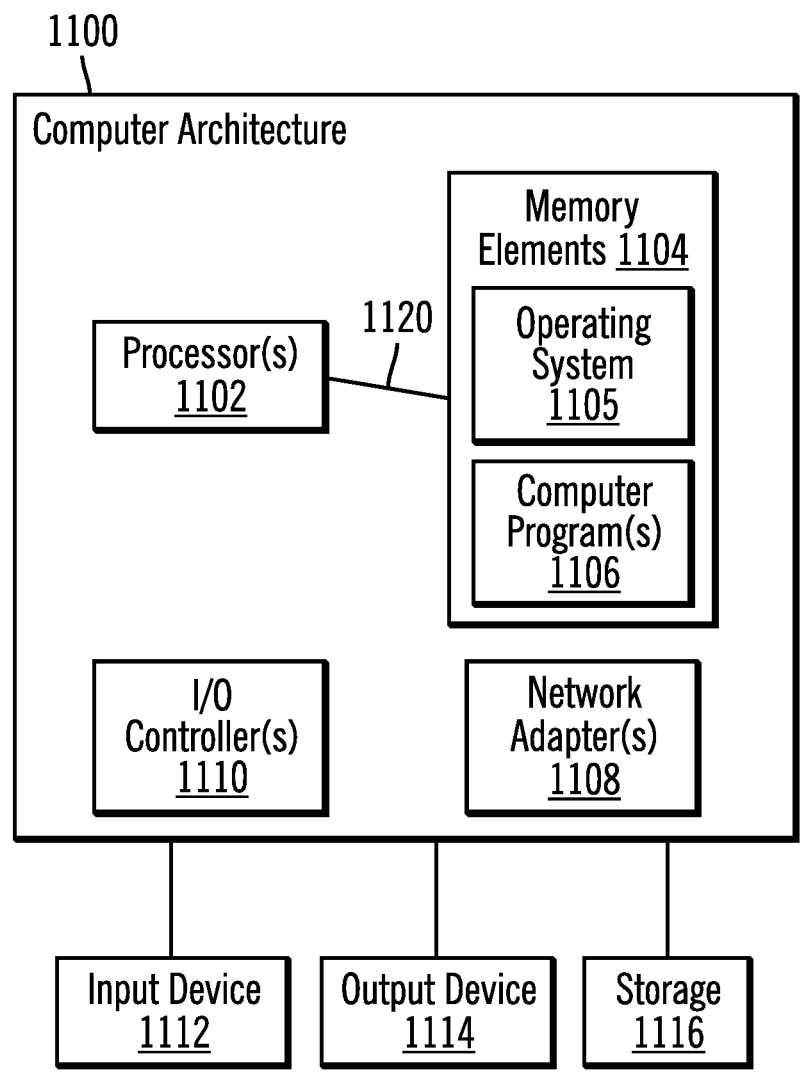
FIG. 11 illustrates, in a block diagram, a computer architecture that may be used in accordance with certain embodiments.

FIG. 11 illustrates a computer architecture 1100 that may be used in accordance with certain embodiments. Computing device 100 may implement computer architecture 1100. The computer architecture 1100 is suitable for storing and/or executing program code and includes at least one processor 1102 coupled directly or indirectly to memory elements 1104 through a system bus 1120. The memory elements 1104 may include local memory employed during actual execution of the program code, bulk storage, and cache memories which provide temporary storage of at least some program code in order to reduce the number of times code must be retrieved from bulk storage during execution. The memory elements 1104 include an operating system 1105 and one or more computer programs 1106.

Input/Output (I/O) devices 1112, 1114 (including but not limited to keyboards, displays, pointing devices, etc.) may be coupled to the system either directly or through intervening I/O controllers 1110.

Network adapters 1108 may also be coupled to the system to enable the data processing system to become coupled to other data processing systems or remote printers or storage devices through intervening private or public networks. Modems, cable modem and Ethernet cards are just a few of the currently available types of network adapters 1108.

The computer architecture 1100 may be coupled to storage 1116 (e.g., any type of storage device or a non-volatile storage area, such as magnetic disk drives, optical disk drives, a tape drive, etc.). The storage 1116 may comprise an internal storage device or an attached or network accessible storage. Computer programs 1106 in storage 1116 may be loaded into the memory elements 1104 and executed by a processor 1102 in a manner known in the art.

The computer architecture 1100 may include fewer components than illustrated, additional components not illustrated herein, or some combination of the components illustrated and additional components. The computer architecture 1100 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for incrementally integrating and persisting context over an available observational space, comprising:
   obtaining a new observation for an entity;
   using at least one feature associated with the new observation to create at least one index key;
   using the at least one index key to query one or more reverse lookup tables to identify previously persisted candidates observations from previously persisted observations, wherein each of the one or more reverse lookup tables has an associated index;
   using a threshold to make a new assertion about how the new observation and a first previously persisted candidate observation are related to the entity based on a number of features of the new observation and the first previously persisted candidate observation matching;
   using the new observation to review previous assertions to determine that a previous assertion that indicated that two previously persisted candidate observations were one of same and related is to be reversed;
   in response to reversing the previous assertion, incrementally integrating the new observation, the new assertion, and the reversed assertion into persistent context, wherein the persistent context is represented with assertions that indicate which of the new observation and the previously persisted observations are at least one of same and related; and using the persistent context to make a business decision.

2. The method of claim 1, wherein values of the one or more reverse lookup tables and each associated index are distributed over multiple tables, and further comprising:

using a hash technique to evenly distribute the values of the one or more reverse lookup tables and each associated index over the multiple tables.

3. The method of claim 1, further comprising:

storing a set of observations, wherein the observations include projections.

4. The method of claim 1 further comprising:

storing a set of observations, wherein the observations include transactional data.

5. The method of claim 1, further comprising:

storing a set of observations, wherein the observations include reference data.

6. The method of claim 1, further comprising:

storing a set of observations, wherein the observations include queries from users or systems.

7. The method of claim 1, wherein the new observation is related to existing observations based on a plurality features, and wherein the plurality of features includes functions of features.

8. The method of claim 7, wherein the plurality of features includes at least one of location and time.

9. The method of claim 1, wherein the new observation includes a space time coordinate, and wherein the index key is used to identify candidate observations based on the space time coordinate.

10. The method of claim 1, further comprising:

determining that the new observation and a first previously persisted candidate observation are a same observation for the entity that form a conjoined observation.

* * * * *